United States Patent
Yokota et al.

(10) Patent No.: US 10,467,489 B2
(45) Date of Patent: Nov. 5, 2019

(54) DISTRACTED DRIVING DETERMINATION APPARATUS, DISTRACTED DRIVING DETERMINATION METHOD, AND RECORDING MEDIUM HAVING PROGRAM FOR DISTRACTED DRIVING DETERMINATION

(71) Applicants: OMRON Corporation, Kyoto-shi, Kyoto (JP); OMRON Automotive Electronics Co. Ltd., Komaki-shi, Aichi (JP)

(72) Inventors: Keisuke Yokota, Kasugai (JP); Masato Tanaka, Kizugawa (JP); Yoshio Matsuura, Kasugai (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/179,975

(22) Filed: Nov. 4, 2018

(65) Prior Publication Data
US 2019/0147272 A1 May 16, 2019

(30) Foreign Application Priority Data
Nov. 15, 2017 (JP) ................................. 2017-219887

(51) Int. Cl.
| | |
|---|---|
| G06K 9/00 | (2006.01) |
| B60W 40/09 | (2012.01) |
| G06F 3/01 | (2006.01) |
| B60W 50/14 | (2012.01) |
| G06F 3/03 | (2006.01) |

(52) U.S. Cl.
CPC ......... *G06K 9/00845* (2013.01); *B60W 40/09* (2013.01); *B60W 50/14* (2013.01); *G06F 3/012* (2013.01); *G06F 3/013* (2013.01); *G06F 3/0304* (2013.01); *G06K 9/00597* (2013.01); *B60W 2050/143* (2013.01)

(58) Field of Classification Search
CPC .................................. G06F 1/00; B60R 1/00
See application file for complete search history.

(56) References Cited

U.S. PATENT DOCUMENTS

2017/0210323 A1* 7/2017 Cordova ............... B60W 30/08
2017/0305349 A1* 10/2017 Naboulsi ................ B60R 1/025

FOREIGN PATENT DOCUMENTS

JP  H8-207617 A  8/1996

\* cited by examiner

*Primary Examiner* — Shirley Lu
(74) *Attorney, Agent, or Firm* — Metrolex IP Law Group, PLLC

(57) ABSTRACT

A driver performing a lane check by looking back for safe driving can be alerted based on the driver's gaze deviating from a view area for usual driving. A distracted driving determination apparatus, a distracted driving determination method, and a program for distracted driving determination recorded on a recording medium compare a change pattern detected from changes in the gaze or face orientation of the driver with a predetermined reference pattern, and change a usual determination condition for detecting distracted driving to a temporary determination condition when the change pattern matches the reference pattern. This prevents the line check from being determined to be distracted driving.

11 Claims, 7 Drawing Sheets

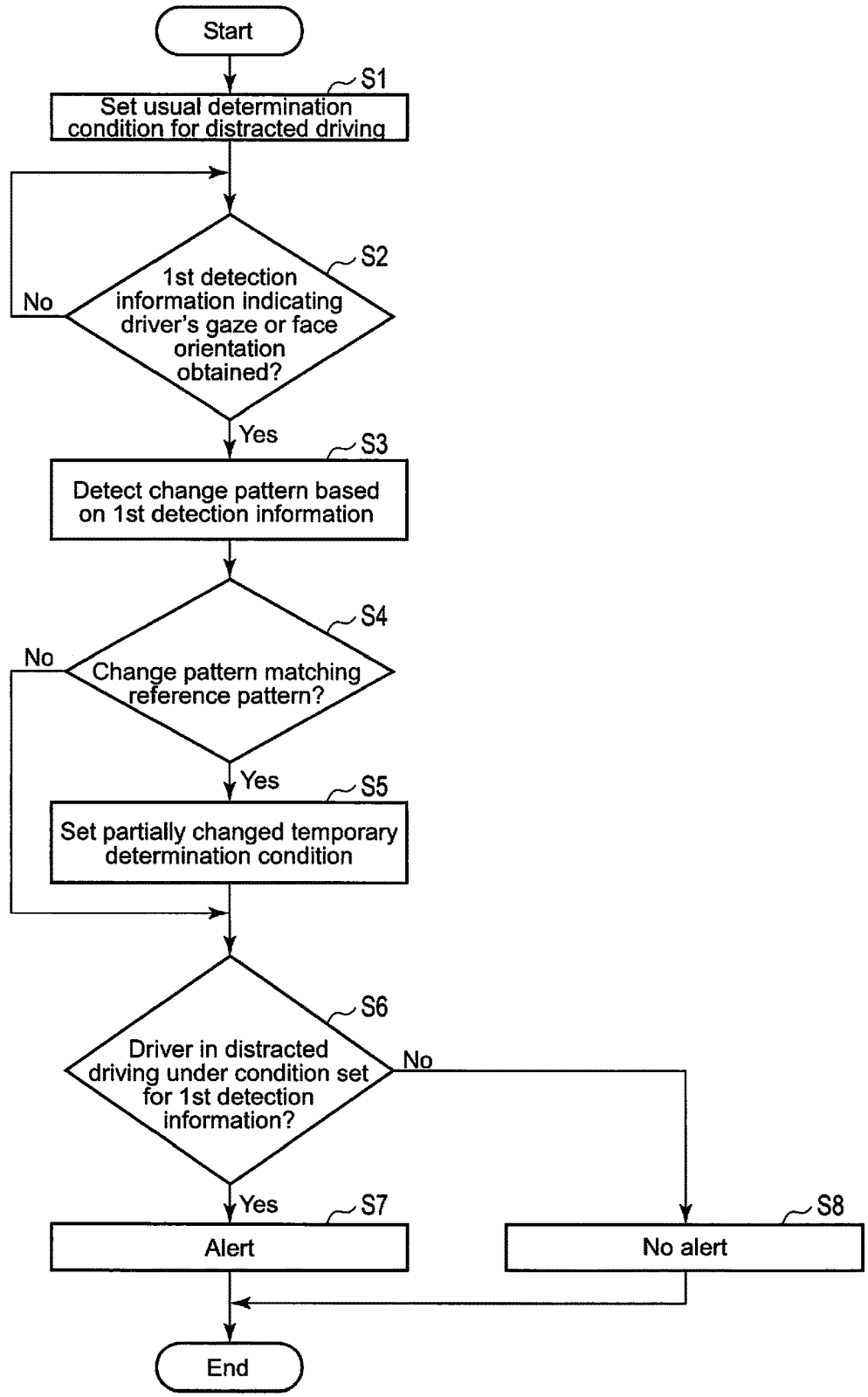

DISTRACTED DRIVING DETERMINATION APPARATUS, DISTRACTED DRIVING DETERMINATION METHOD, AND RECORDING MEDIUM HAVING PROGRAM FOR DISTRACTED DRIVING DETERMINATION

CROSS-REFERENCE TO RELATED APPLICATION

This application claims priority to Japanese Patent Application No. 2017-219887 filed on Nov. 15, 2017, the entire disclosure of which is incorporated herein by reference.

FIELD

Aspects of the present invention relate to a distracted driving determination apparatus, a distracted driving determination method, and a recording medium having a program for distracted driving determination recorded thereon.

Nowadays, vehicles such as automobiles have safe drive modes with various techniques for prompting the driver to drive safely while the vehicle is traveling. One known example is a technique described in Patent Literature 1 for detecting distracted driving and alerting the driver. The technique described in Patent Literature 1 uses a gaze detection sensor to detect the irises of the driver's eyes and determine the gaze direction of the driver to determine whether the driver is gazing at a position within an area predefined for detecting distracted driving. When the driver is gazing at a position within the area, the driver is determined to be engaging in distracted driving. An alert unit then alerts the driver.

CITATION LIST

Patent Literature

Patent Literature 1: Japanese Unexamined Patent Application Publication No. 8-207617

SUMMARY

Technical Problem

However, the technique described in Patent Literature 1 has the issue described below. The driver may not always look in the forward direction of the vehicle, but may direct his or her gaze in a direction of an area defined to detect distracted driving for safety checking. For example, when changing lanes, the driver looks back at least once by turning his or her head around to check diagonally behind for any vehicle traveling behind in the adjacent lane.

The driver performs such a lane check by looking back to check the dead spot of the side mirror for safe driving. However, this check action in changing lanes may be determined to be distracted driving based simply on the driver's gaze deviating from a predefined view area as with the technique described in Patent Literature 1, and may be alerted.

One or more aspects of the present invention are directed to a distracted driving determination apparatus, a distracted driving determination method, and a recording medium having a program for distracted driving determination that reduce erroneous determination of a lane check by the driver to be distracted driving and thus reduce unintended alerts.

Solution to Problem

In response to the above issue, a distracted driving determination apparatus according to a first aspect of the present invention includes a first obtaining unit that obtains first detection information indicating a change pattern of a gaze or a face orientation of a driver, a change pattern determiner that reads the change pattern obtained by the first obtaining unit and determines whether the change pattern matches a reference pattern predetermined in accordance with a lane check by the driver, a condition changer that changes a usual determination condition for detecting distracted driving and sets a temporary determination condition when the change pattern is determined to match the reference pattern, and a distracted driving determiner that determines distracted driving based on the first detection information using the usual determination condition or the temporary determination condition set by the condition changer.

The distracted driving determination apparatus according to the first aspect changes the determination condition for detecting distracted driving and sets the temporary determination condition when the change pattern of the face orientation or the gaze direction of the driver looking back is determined to match the predetermined reference pattern, and thus prevents such a quick lane check from being erroneously determined to be distracted driving and causing an unintended alert.

In the distracted driving determination apparatus according to the first aspect, the change pattern determiner defines an imaginary lane check area at least rightward or leftward from a vehicle. The change pattern determiner determines that the change pattern of the gaze or the face orientation of the driver matches the reference pattern associated with a lane check by the driver when the gaze or the face orientation of the driver indicated by the first detection information changes by at least an angle of the lane check area and also the gaze or the face orientation is redirected to an original position within a predetermined first duration after starting to change from the original position.

The apparatus according to the first aspect determines that the driver's action is a lane check when the gaze or the face orientation of the driver is redirected to the original position within the predetermined criterion duration after starting to change from the original position in accordance with the change pattern of the face orientation or the gaze direction of the driver looking back in the lane check area. The apparatus thus prevents such a lane check from being erroneously determined to be distracted driving and causing an unintended alert.

In the apparatus according to the first aspect, the change pattern determiner defines an imaginary first lane check area at a position of a side mirror at least rightward or leftward from a vehicle, and an imaginary second lane check area rearward from the first lane check area for the driver to directly check a lane. The change pattern determiner determines that the change pattern of the gaze or the face orientation of the driver is associated with a lane check by the driver when the gaze or the face orientation indicated by the first detection information starts changing and is retained in the first lane check area, changes by at least an angle of the second lane check area, and also the gaze or the face orientation is redirected to an original position within a predetermined second duration after starting to change from the original position.

In the apparatus according to the first aspect, the change pattern determiner includes the determination reference that matches a change pattern for the action of the driver checking a side mirror once when looking back, which is a relatively common action as a lane check and takes a longer time than in a change pattern for the action of the driver looking back in one stroke and redirecting his or her face frontward. This reduces erroneous determination of distracted driving and thus reduces unintended alerts.

The distracted driving determination apparatus according to the first aspect further includes a second obtaining unit that obtains second detection information indicating an operation of a steering unit for changing a traveling direction of the vehicle. The condition changer changes the determination condition for detecting distracted driving and sets the temporary determination condition during the operation of the steering unit for changing the traveling direction of the vehicle indicated by the second detection information.

The apparatus according to the first aspect determines that the lane check continues with the driving operation for changing lanes during the operation of the direction changer or the steering operation, which is the operation of the steering unit for changing the traveling direction of the vehicle, although the gaze of the driver is not redirected to the predefined view area and the check operation takes more than the predetermined determination criterion duration. The apparatus thus prevents such a lane check from being erroneously determined to be distracted driving.

The apparatus according to the first aspect further includes an alert instruction unit that outputs an instruction signal to generate an alert when the distracted driving determiner detects distracted driving.

The distracted driving determination apparatus determines that the change pattern of the gaze or face orientation of the driver matches the reference pattern when the driver performs a lane check for safe driving. In this case, the determination condition for detecting distracted driving is changed, and no alert instruction is generated. When the driver has a change pattern for an action other than a lane check, such a change pattern does not match the reference pattern, and thus the alert instruction unit outputs an instruction signal to the alert unit to generate an alert. The alert unit then alerts the driver to distracted driving.

A distracted driving determination method according to a second aspect implemented by a distracted driving determination apparatus is a method implemented by an in-vehicle apparatus. The method includes obtaining first detection information indicating a gaze or a face orientation of a driver, determining whether the driver is engaging in distracted driving based on the gaze or the face orientation of the driver indicated by the first detection information using a determination condition for detecting distracted driving, detecting a change pattern of the gaze or the face orientation of the driver based on the first detection information and determining whether the change pattern matches a reference pattern predetermined in accordance with a lane check by the driver, and changing the determination condition for detecting distracted driving and setting a temporary determination condition when the change pattern is determined to match the reference pattern.

The method according to the second aspect changes the determination condition for detecting distracted driving and sets the temporary determination condition when the change pattern of the face orientation or the gaze direction of the driver looking back is determined to match the predetermined reference pattern, and thus prevents such a quick lane check from being erroneously determined to be distracted driving and causing an unintended alert.

The method determines that the lane check continues with the driving operation for changing lanes during the operation of the direction changer or the steering operation, although the gaze of the driver is not redirected to the predefined view area and the check operation takes more than the predetermined determination criterion duration. The method thus prevents such a lane check from being erroneously determined to be distracted driving.

A non-transitory recording medium according to a third aspect of the present invention records a program causing a hardware processor included in a distracted driving determination apparatus to function as the units included in the distracted driving determination apparatus.

The non-transitory recording medium having a program for distracted driving determination recorded thereon according to the third aspect produces the same advantageous effects as the distracted driving determination apparatus according to the first aspect.

Advantageous Effects

The distracted driving determination apparatus, the distracted driving determination method, and the recording medium having a program for distracted driving determination recorded thereon according to the aspects of the present invention reduce erroneous determination of a lane check by the driver to be distracted driving and thus reduce unintended alerts.

BRIEF DESCRIPTION OF THE DRAWINGS

FIG. 8 is a flowchart describing a lane check action.

DETAILED DESCRIPTION

Figure 1:
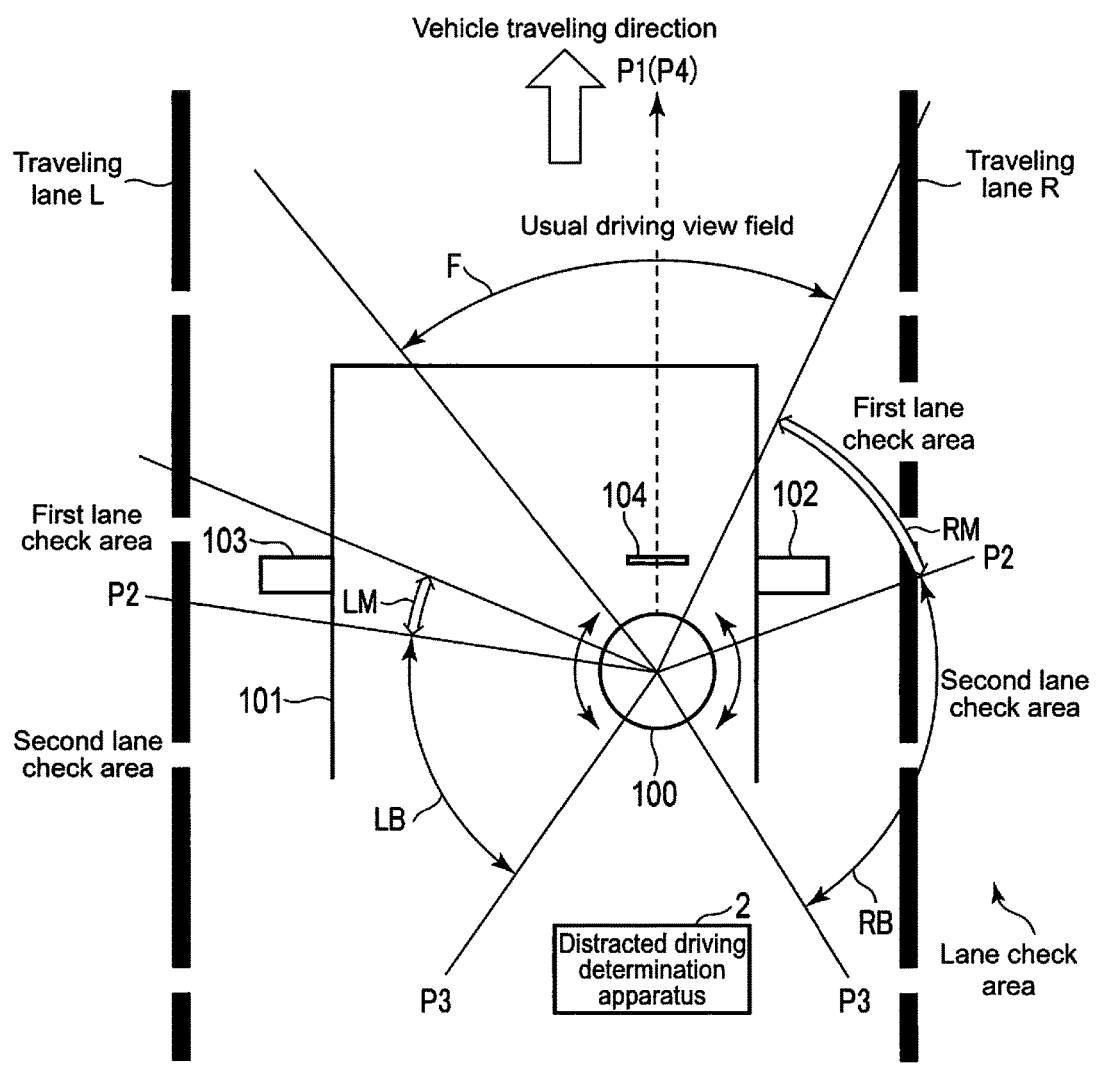
FIG. 1 is a schematic diagram describing an example use of a distracted driving determination apparatus according to an embodiment.

An embodiment of the present invention will now be described with reference to the drawings.

The present embodiment described below is a mere example in any aspect. The same or similar components as already described are given the same or similar reference numerals, and will not be described repeatedly. Although data used in the present embodiment is described in a natural language, such data may be specifically defined using a pseudo language, a command, a parameter, or a machine language.

Example Use

An example use of a distracted driving determination apparatus according to one embodiment of the present invention will now be described.

Figure 2:
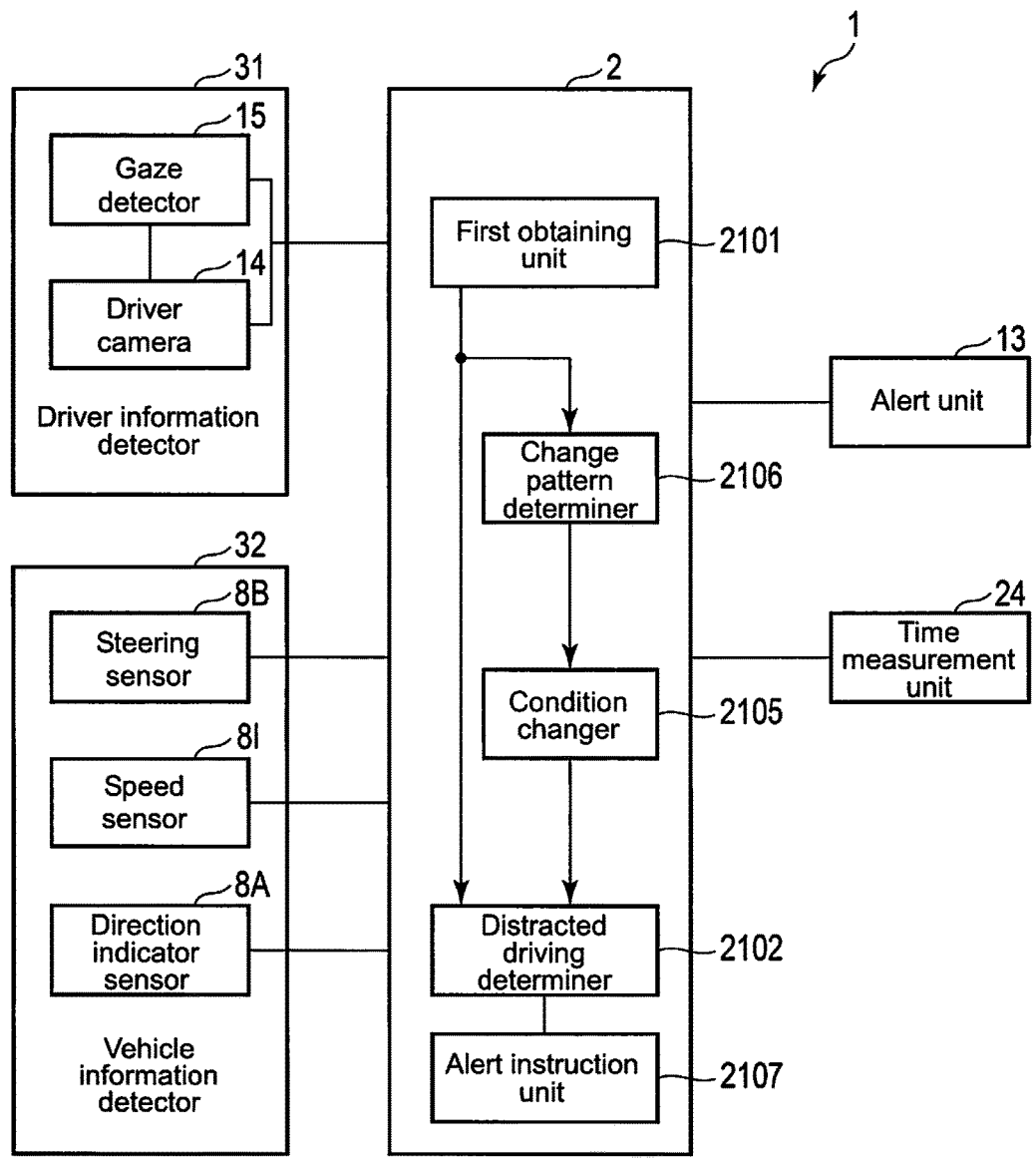
FIG. 2 is a block diagram of the structure for determining a lane check in distracted driving determination using the distracted driving determination apparatus.

FIG. 1 is a schematic diagram describing the example use of the distracted driving determination apparatus according to the embodiment. FIG. 2 is a block diagram of the structure for determining a lane check in distracted driving determination using the distracted driving determination apparatus. A lane check herein refers to the driver's action of looking back diagonally to directly check, before changing lanes, for any vehicle behind in the adjacent lane to move to. In the lane check, the driver directs his or her face rearward to have a gaze P1 deviating from a check area F, which is an imaginary view area for usual driving. The driver's action of looking back includes redirecting his or her face orientation and gaze to an imaginary area defined for a lane check (RM, RB, LM, LB) to directly check for any vehicle traveling in the adjacent lane, and then immediately changing his or her face orientation and gaze back to the check area F. Distracted driving or looking away from the front herein refers an act of the driver gazing at a position outside the usual driving view area defined in the traveling direction of the vehicle.

The distracted driving determination apparatus 2 includes a distracted driving determiner 2102, which has a usual determination condition for detecting distracted driving during usual driving. The distracted driving determiner 2102 obtains a change pattern, or a pattern of chronological changes in the face orientation and gaze direction of the driver from, for example, image data including a moving image or consecutive images of the head of the driver. A change pattern determiner 2106 includes multiple reference patterns set for a lane check, with which the change pattern determiner 2106 compares an obtained change pattern to determine whether the driver's action represented by the change pattern is a lane check. When the change pattern determiner 2106 determines that the action is a lane check based on the change pattern matching one of the reference patterns, the condition changer 2105 changes the determination condition used in the distracted driving determiner 2102 from the usual determination condition to a temporary determination condition partially changed from the usual determination condition. The temporary determination condition includes at least a partial change from the usual determination condition to prevent an action to be distracted driving under the usual determination condition from being determined to be distracted driving when the detected action corresponds to the change pattern that matches one of the predetermined reference patterns. When the change pattern does not match any of the reference patterns, the action is determined to be other than a lane check, and the usual determination condition is unchanged. When detecting a change pattern indicating a lane check, the distracted driving determiner 2102 uses a temporary determination condition including a partial change from the usual determination condition for detecting distracted driving, and generates no alert to the driver.

A lane check herein refers to one check action of the driver for safe driving. The lane check may include the driver looking back by turning his or her head around (hereafter, looking back) to directly check the lane when changing lanes or merging into or cutting in the lane while the vehicle is traveling.

Embodiment

Structure
(1) In-Vehicle System

The overall structure of an in-vehicle system including the distracted driving determination apparatus will now be described.

Figure 3:
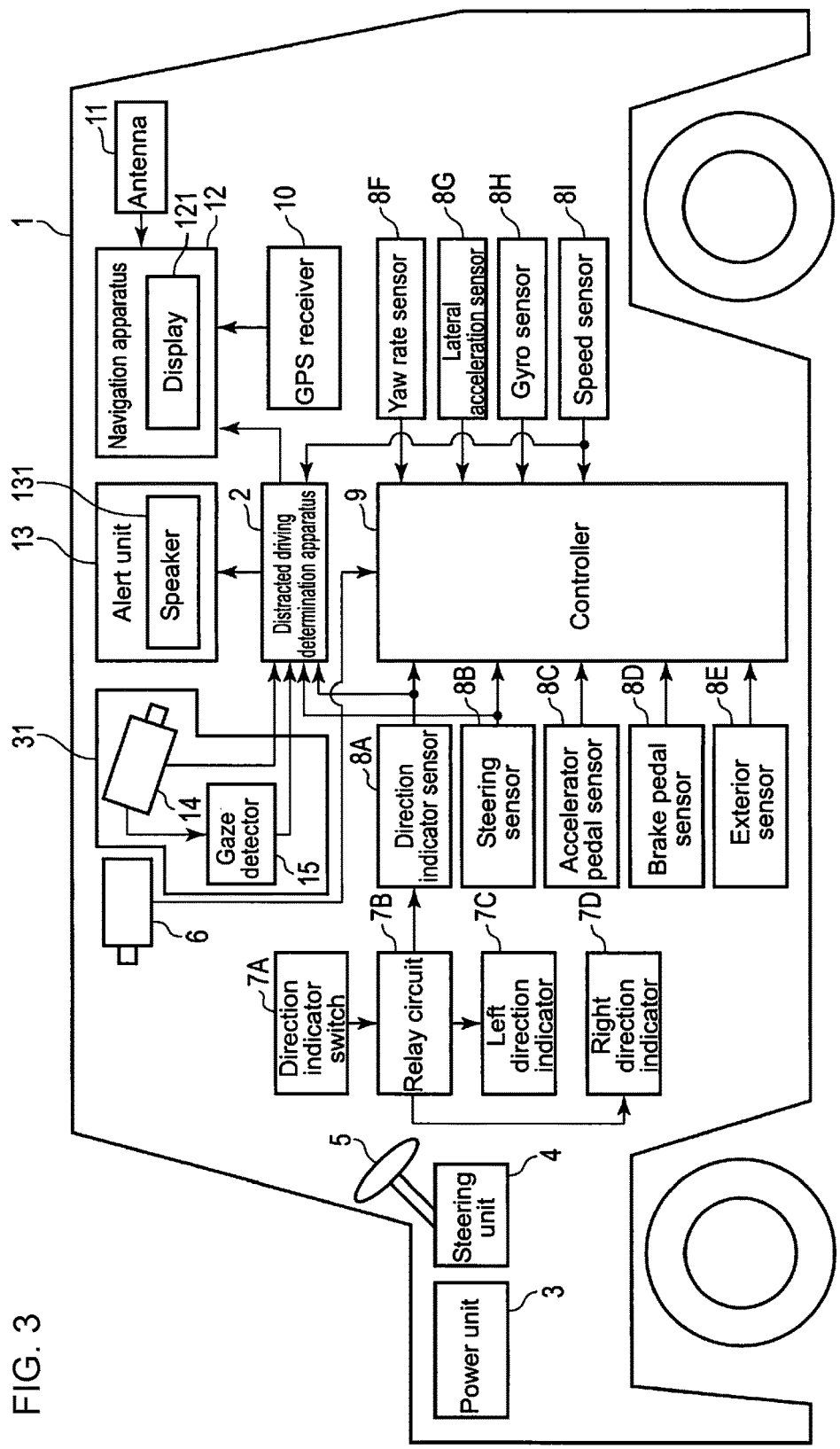
FIG. 3 is a schematic diagram of an in-vehicle system according to an embodiment showing its overall structure.

FIG. 3 is a schematic diagram of the in-vehicle system showing its overall structure. A vehicle 1 may be any of, for example, an automobile, a bus, a truck, and a train or may be any other vehicle drivable by a driver.

The vehicle 1 includes the distracted driving determination apparatus 2, a power unit 3, a steering unit 4, a steering wheel 5, an exterior view camera 6, a direction indicator switch 7A, a relay circuit 7B, a left direction indicator 7C, a right direction indicator 7D, a direction indicator sensor 8A, a steering sensor 8B, an accelerator pedal sensor 8C, a brake pedal sensor 8D, an exterior sensor 8E, a yaw rate sensor 8F, a lateral acceleration sensor 8G, a gyro sensor 8H, a speed sensor 8I, a controller 9, a global positioning system (GPS) receiver 10, an antenna apparatus 11, a navigation apparatus 12, an alert unit 13, and a driver information detector 31. The driver information detector 31 includes a driver camera 14 and a gaze detector 15. The left direction indicator 7C and the right direction indicator 7D are hereafter collectively simply referred to as the direction indicator.

The distracted driving determination apparatus 2 uses a moving image or consecutive images of the driver's face orientation (first driver information) captured by the driver camera 14, or the driver's gaze direction (second driver information) detected by the gaze detector 15 to determine whether the driver is engaging in distracted driving or is performing a lane check (described later) based on a determination condition for determining whether the action is distracted driving or a lane check.

The usual determination condition is, for example, associated with multiple imaginary view areas or check areas defined around the driver for detecting distracted driving. Such determination conditions will be described later. Distracted driving may refer to looking in a direction away from the view area for usual driving. The specific structure of the distracted driving determination apparatus 2 will be described later.

The power unit 3 includes a power source and a transmission. The power source includes an engine or a motor or both. The steering unit 4 changes the traveling direction of the vehicle 1.

The steering wheel 5 is connected to the steering unit 4. The steering wheel 5 is operated by the driver to change the traveling direction of the vehicle 1.

The exterior view camera 6 captures an image of the exterior of the vehicle 1. For example, the exterior view camera 6 constantly captures images in front of the vehicle 1. The exterior view camera 6 outputs the captured images (hereafter, exterior image data) to the controller 9. The exterior view camera 6 is installed at a given position of the vehicle 1. Although FIG. 3 shows the single exterior view camera 6, the vehicle 1 may include multiple exterior view cameras 6 for capturing images in different directions.

The direction indicator switch 7A is operated by the driver to activate the left direction indicator 7C or the right direction indicator 7D when changing the traveling direction of the vehicle 1. When changing the traveling direction of the vehicle 1 leftward, the driver manually switches the direction indicator switch 7A from its initial position to a first position. When changing the traveling direction of the vehicle 1 rightward, the driver manually switches the direction indicator switch 7A from its initial position to a second position. The direction indicator switch 7A is manually switched by the driver from the first position or the second position back to the initial position. The direction indicator switch 7A may also switch from the first position back to the initial position in cooperation with when the driver operating the steering wheel 5 counterclockwise operates the steering wheel 5 back to its initial position. Similarly, the direction indicator switch 7A may switch from the second position back to the initial position in cooperation with when the driver operating the steering wheel 5 clockwise operates the steering wheel 5 back to the initial position.

The relay circuit 7B supplies power to the left direction indicator 7C or the right direction indicator 7D in accordance with the position of the direction indicator switch 7A. The relay circuit 7B starts supplying power to the left direction indicator 7C in response to switching of the direction indicator switch 7A from the initial position to the first position. The relay circuit 7B continuously supplies power to the left direction indicator 7C while the direction indicator switch 7A is at the first position. The relay circuit 7B stops supplying power to the left direction indicator 7C in response to switching of the direction indicator switch 7A from the first position to the initial position. Similarly, the relay circuit 7B starts supplying power to the right direction indicator 7D in response to switching of the direction indicator switch 7A from the initial position to the second position. The relay circuit 7B continuously supplies power to the right direction indicator 7D while the direction indicator switch 7A is at the second position. The relay circuit 7B stops supplying power to the right direction indicator 7D in response to switching of the direction indicator switch 7A from the second position to the initial position.

The left direction indicator 7C is connected to the relay circuit 7B. The left direction indicator 7C includes, for example, a lightbulb or a light-emitting diode (LED). The left direction indicator 7C may be mounted on a left part of the vehicle 1. Although FIG. 3 shows the single left direction indicator 7C, the vehicle 1 includes multiple left direction indicators 7C at positions including a left front end and a left rear end of the vehicle 1. The left direction indicator 7C blinks when powered through the relay circuit 7B.

The right direction indicator 7D is connected to the relay circuit 7B. The right direction indicator 7D includes, for example, a lightbulb or an LED. The right direction indicator 7D may be mounted on a right part of the vehicle 1. Although FIG. 3 shows the single right direction indicator 7D, the vehicle 1 includes multiple right direction indicators 7D at positions including a right front end and a right rear end of the vehicle 1. The right direction indicator 7D blinks when powered through the relay circuit 7B.

The direction indicator sensor 8A is included in the relay circuit 7B. The direction indicator sensor 8A detects an operation start and an operation end of the left direction indicator 7C based on the state of power supply to the left direction indicator 7C through the relay circuit 7B. The direction indicator sensor 8A detects an operation start and an operation end of the right direction indicator 7D based on the state of power supply to the right direction indicator 7D through the relay circuit 7B. The direction indicator sensor 8A outputs detection information indicating the operational state of each direction indicator to the distracted driving determination apparatus 2 and the controller 9. The direction indicator herein refers to either the left direction indicator 7C or the right direction indicator 7D. The detection information indicating the operational state of each direction indicator indicates an operational state selected from an operation start of the left direction indicator 7C, an operation end of the left direction indicator 7C, an operation start of the right direction indicator 7D, and an operation end of the right direction indicator 7D.

The steering sensor 8B detects a steering angle. The steering sensor 8B outputs detection information indicating the steering angle to the controller 9 and a control unit 21 in the distracted driving determination apparatus 2.

The accelerator pedal sensor 8C detects an operational quantity of an accelerator pedal. The accelerator pedal sensor 8C outputs detection information indicating the operational quantity of the accelerator pedal to the controller 9.

The brake pedal sensor 8D detects an operational quantity of a brake pedal. The brake pedal sensor 8D outputs detection information indicating the operational quantity of the brake pedal to the controller 9.

The exterior sensor 8E may be, for example, a millimeter wave sensor. The exterior sensor 8E detects the position of an object external to the vehicle 1. The exterior sensor 8E outputs detection information indicating the position of the object to the controller 9.

The yaw rate sensor 8F detects a rotational angle velocity about the vertical axis of the vehicle 1. The yaw rate sensor 8F outputs detection information indicating the rotational angle velocity to the controller 9.

The lateral acceleration sensor 8G detects an acceleration in a lateral direction (width direction) of the vehicle 1 (hereafter, lateral acceleration). The lateral acceleration sensor 8G outputs detection information indicating the lateral acceleration to the controller 9.

The gyro sensor 8H detects the behavior of the vehicle 1. The gyro sensor 8H outputs detection information indicating a quantity associated with the behavior of the vehicle 1 to the controller 9.

The speed sensor 8I detects the speed of the vehicle 1. The speed sensor 8I outputs detection information indicating the speed to the distracted driving determination apparatus 2 and the controller 9.

The controller 9 receives exterior image data from the exterior view camera 6 and detection information from the direction indicator sensor 8A, the steering sensor 8B, the accelerator pedal sensor 8C, the brake pedal sensor 8D, the exterior sensor 8E, the yaw rate sensor 8F, the lateral acceleration sensor 8G, the gyro sensor 8H, and the speed sensor 8I. The controller 9 uses detection information from at least one of these sensors to support driving of the vehicle 1.

The GPS receiver 10 receives GPS signals transmitted from multiple GPS satellites, and calculates the current location of the vehicle 1 based on the GPS signals. The GPS receiver 10 outputs information indicating the current location (hereafter, current location information) to the navigation apparatus 12.

The antenna apparatus 11 receives road traffic information, or specifically information from the Vehicle Information and Communication System (VICS, registered trademark), with at least one of frequency modulation (FM) multiplex broadcasting, a radio wave beacon, and a light beacon. The road traffic information includes, for example, traffic jam information and traffic control information. The antenna apparatus 11 transmits the road traffic information to the navigation apparatus 12.

The navigation apparatus 12 is an example of an image display device including a display 121 for displaying an image. The navigation apparatus 12 stores map data. The map data includes information about the features of roads.

The navigation apparatus 12 uses information about a destination input by, for example, the driver, map data, and current location information from the GPS receiver 10 to extract information about routes from the current location to the destination. The navigation apparatus 12 displays the route information on the display 121. The navigation apparatus 12 displays road traffic information from the antenna apparatus 11 on the display 121. The navigation apparatus 12 may display information other than the route information and the road traffic information on the display 121.

The alert unit 13 includes a speaker 131. When the distracted driving determiner 2102 (described later) detects distrkted driving, an alert instruction unit 2107 outputs an instruction signal to the alert unit 13 to generate an alert. In response to the alert instruction, the alert unit 13 outputs an alert or various types of information to the driver to prompt safe driving using a voice message from the speaker 131. The alert unit may generate a visual alert including a text display or emission or blinking of light, or an audible alert including a buzzer, in addition to an alert using a voice message. The alert may be audible (including a voice message) or visual, or a combination of audible and visual alerts.

The driver camera 14 is an example of a sensor for monitoring the driver. The driver camera 14 includes a visible light camera using a known solid-state image sensor such as a charge-coupled device (CCD) image sensor or a complementary metal oxide semiconductor (CMOS) image sensor. The driver camera 14 captures a moving image or consecutive images of the head of the driver. The driver camera 14 is not limited to a visible light camera, but may be combined with an infrared light (infrared rays) camera that enables image capturing at night. The driver camera 14 may constantly capture images of a predefined range including the face of the driver during day and night. The driver camera 14 is installed in front of the driver, for example, on the dashboard. An image processing unit (not shown) in the driver information detector 31 generates driver information (first driver information) about changes in the face orientation of the driver using an image captured by the driver camera 14. Although the image processing unit (not shown) in the driver information detector 31 generates the first driver information about changes in the face orientation of the driver in the present embodiment, the driver information may be generated in any manner. When other units do not use the first driver information, images captured by the driver camera 14 may be stored into a storage unit 22 as image data. A first obtaining unit 2101 (described later) may then generate driver information about changes in the face orientation of the driver.

The gaze detector 15 obtains driver information (second driver information) about changes in the gaze direction associated with the movement of the driver's face. The gaze detector 15 includes a known gaze sensor including, for example, an infrared light camera and an infrared light emitting element, and a visible light camera. The gaze detector 15 using infrared light typically detects the gaze direction based on the positional relationship between the corneal reflex of each eye and the pupil using the corneal reflex as a reference. The gaze detector 15 using visible light detects the gaze direction based on the positional relationship between the inner corner of each eye and the iris using the inner corner as a reference. A visible light camera and an infrared camera are used to capture the head of the driver in the present embodiment. Information about the captured image may thus be used to detect the gaze direction.

(2) Distracted Driving Determination Apparatus

Figure 4:
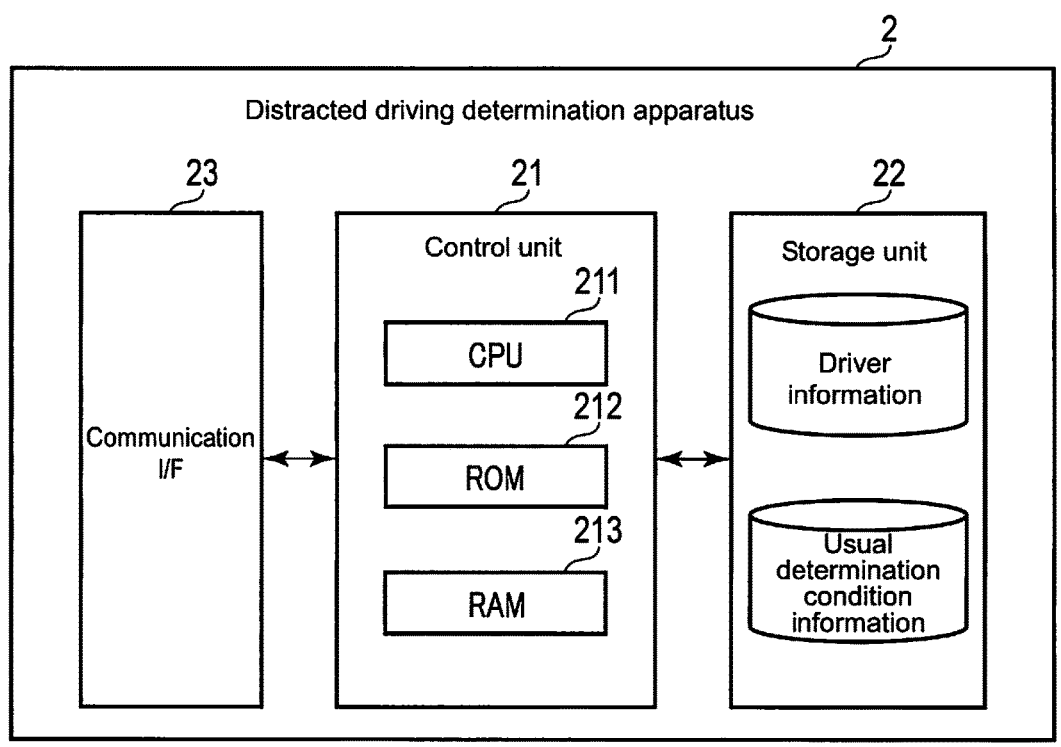
FIG. 4 is a block diagram of the distracted driving determination apparatus showing its hardware configuration.

FIG. 4 is a block diagram of the distracted driving determination apparatus 2 showing its hardware configuration.

The distracted driving determination apparatus 2 includes the control unit 21 implemented by a hardware processor, the storage unit 22, and a communication interface 23, which are electrically connected to one another. In FIG. 4, the communication interface is abbreviated as the communication I/F.

The control unit 21 will now be described. The control unit 21 controls the operation of each unit in the distracted driving determination apparatus 2. The control unit 21 includes a central processing unit (CPU) 211, a read only memory (ROM) 212, and a random access memory (RAM) 213. The CPU 211 is an example of a hardware processor. The CPU 211 expands, in the RAM 213, programs stored in the storage unit 22 for operating the distracted driving determination apparatus 2. The CPU 211 then interprets and executes the programs expanded in the RAM 213. This allows the control unit 21 to implement the function of each unit in the software configuration described later.

The storage unit 22 will now be described.

The storage unit 22 is an auxiliary storage device. The storage unit 22 may be, but not limited to, a hard disk drive (HDD). The storage unit 22 stores programs executable by the control unit 21. The programs enable the distracted driving determination apparatus 2 to function as each unit in the software configuration described later. The programs may be prestored in the storage unit 22, or may be downloaded to the distracted driving determination apparatus 2 through a network. The programs may be stored in a non-transitory computer-readable medium, such as a read-only memory (ROM) and distributed.

The storage unit 22 stores data used by the control unit 21 as described below. The storage unit 22 stores driver image data obtained by the control unit 21 from the driver camera 14. The control unit 21 obtains driver information indicating changes in the face orientation of the driver (first driver information) and driver information about changes in the gaze direction (second driver information) transmitted from the driver information detector 31, and stores the information into the storage unit 22. The storage unit 22 also stores information (hereafter, usual determination condition information) indicating the determination condition under usual driving (hereafter, usual determination condition), which is one of the determination conditions for detecting distracted driving.

Usual driving herein refers to driving of the vehicle without the direction indicator operating. In addition to this condition, usual driving may further include driving of the vehicle 1 at least either at a predetermined speed or faster or in the traveling direction deviating from the straight traveling direction within a predetermined range. Examples of the usual determination condition will be described later. The usual determination condition information includes multiple reference patterns for a lane check (described later). The distracted driving determiner 2102 and the condition changer 2105 each read one of the reference patterns and set the read pattern as a determination criterion.

The communication interface 23 will now be described.

The communication interface 23 connects the direction indicator sensor 8A, the speed sensor 8I, the navigation apparatus 12, the alert unit 13, and the driver camera 14 to the control unit 21. The communication interface 23 may include an interface for wired communication or an interface for wireless communication. For the specific hardware configuration of the distracted driving determination apparatus 2, components may be eliminated, substituted, or added as appropriate. For example, the control unit 21 may include multiple processors.

(3) Distracted Driving Determination Condition

An example distracted driving determination condition will be described with reference to FIGS. 1 and 2.

Under the usual distracted driving determination condition, a driver 100 has his or her gaze within the usual check area F (hereafter, check area F), which is defined as an imaginary view area extending parallel to the road surface on which the driver 100 is traveling. The driver 100 has his or her face orientation and gaze P1 in the same direction as the traveling direction of the vehicle. In distracted driving determination under usual driving, an alert is generated for the driver 100 having the face orientation or the gaze P1 deviating from the check area F. The driving view areas rearward from the check area F, which is defined with respect to the vehicle 101 operated by the driver 100, include imaginary first lane check areas RM and LM (hereafter, lane check areas RM and LM) serving as the view areas for checking the right and left side mirrors (described later) and imaginary second lane check areas RB and LB (hereafter, lane check areas RB and LB) serving as the view areas to which the driver 100 looks back for checking. The first lane check area and the second lane check area may be correctively simply referred to as the imaginary lane check area.

Distracted driving determination under usual driving will now be described.

The check area F is an imaginary area extending parallel to the road surface from the driver 100 frontward from the vehicle 101. The usual determination condition uses the check area F including, for example, the straight traveling direction of the vehicle 101. The check area F has view angles ranging from the road surface to at least the height of a traffic light in the direction perpendicular to the direction parallel to the road surface (horizontal direction). The view angles may be set to any angles. The check area F is associated with appropriate driving without distracted driving of the driver 100. More specifically, the driver 100 having his or her gaze in the check area F has no duration set for the gaze to be retained, and usually has his or her face toward the check area F. The distracted driving determination apparatus 2 does not detect distracted driving when the driver 100 has his or her gaze within the check area F. When the driver 100 has his or her gaze within a view area between the check area F and the check area LM retained for at least a predetermined duration, the distracted driving determination apparatus 2 alerts the driver 100 to distracted driving.

The lane check areas RM and LM, which are imaginary view areas used for checking right and left side mirrors, will now be described.

The lane check areas RM and LM both extend adjacent to the check area F serving as the usual driving view area for the vehicle. These lane check areas include side mirrors 102 and 103. The driver 100 directs his or her gaze in the lane check areas RM and LM for checking the rear or the side of the vehicle 101. Under the usual determination condition, the distracted driving determination apparatus 2 may detect distracted driving and generate an alert when the driver 100 retains his or her gaze or face orientation within the lane check areas RM and LM for at least a predetermined duration.

The lane check areas RB and LB, which are imaginary view areas into which the driver 100 directs his or her gaze when looking back for checking, will now be described.

The lane check areas RB and LB extend rearward from the side mirrors 102 and 103. The driver 100 directs his or her gaze into the areas when looking back by turning his or her head around for checking. With the traveling direction of the vehicle defined as the 12 o'clock direction in one example, the lane check area RB extends from the lane check area RM to an end of an area corresponding to substantially the 16 o'clock direction. A gaze P3 is along this area end. Similarly, the lane check area LB extends from the lane check area LM to an end of an area corresponding to substantially the 8 o'clock direction. A gaze P3 is also along this area end. These area ends are not limited, but may be in any directions in which the driver 100 can check the vehicle traveling behind in the adjacent lane. These area ends may differ depending on each driver 100. Under the usual determination condition, the distracted driving determination apparatus 2 may detect distracted driving and generate an alert when the driver 100 retains his or her gaze or face orientation within the lane check areas RB and LB for at least a predetermined duration.

The above alert unit 13 and distracted driving determination apparatus 2 included in the vehicle 1 may be combined into a distracted driving alert system. Specifically, the distracted driving determination apparatus 2 detects distracted driving and activates the alert unit 13 to alert the driver for safe driving.

Figure 5:
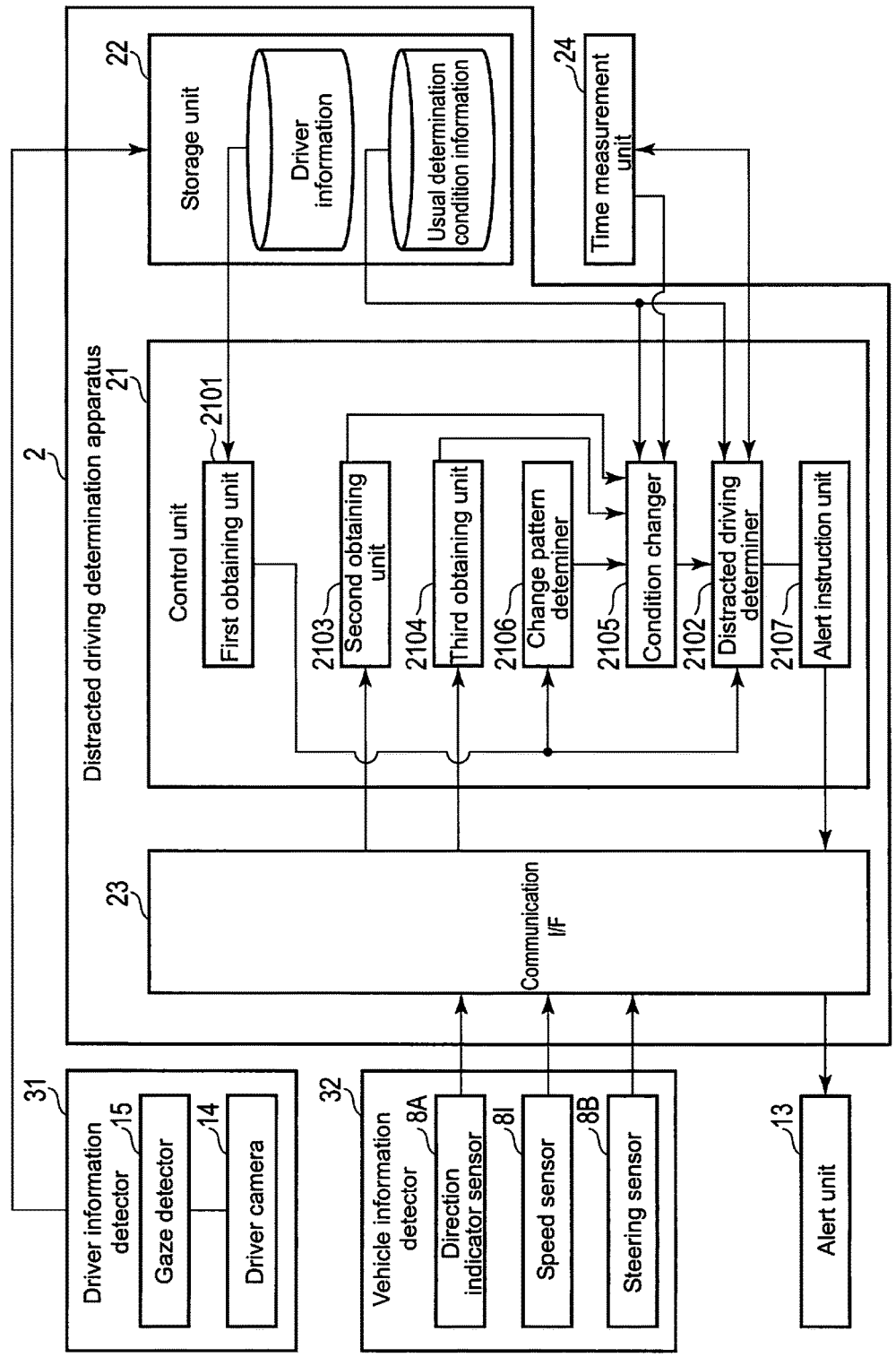
FIG. 5 is a block diagram of the distracted driving determination apparatus according to the present embodiment showing its software configuration.
Figure 6:
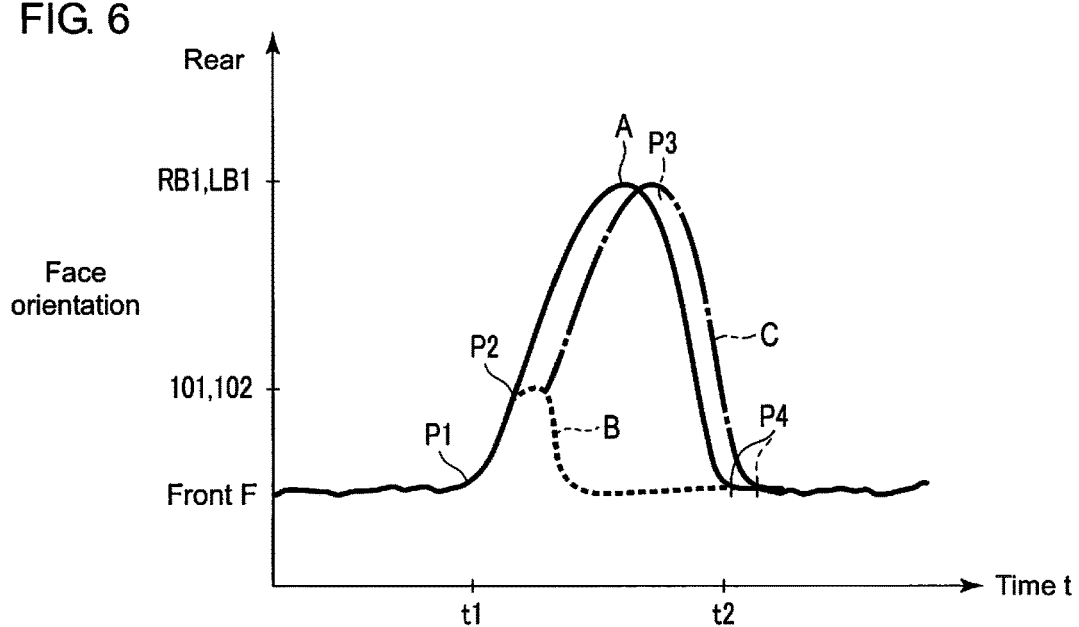
FIG. 6 is a graph showing reference patterns indicating changes in the face orientation with time during a lane check used for lane check determination.

FIG. 5 is a block diagram of the distracted driving determination apparatus 2 showing its software configuration. FIG. 6 is a graph showing reference patterns indicating changes in the face orientation with time during a lane check used for lane check determination.

The distracted driving determination apparatus 2 includes the control unit 21, the communication interface (I/F) 23, and the storage unit 22. The distracted driving determination apparatus 2 also uses an external time measurement unit 24. The time measurement unit 24 may be included in the control unit 21.

The time measurement unit 24 measures the time taken for a lane check as the determination condition used by the distracted driving determination apparatus 2. The time measurement unit 24 starts measuring time when the driver information detector 31 detects the face orientation or gaze of the driver deviating from the check area F. The measured time information is output to the distracted driving determiner 2102 and the condition changer 2105 (described later). The time measurement unit 24 may stop measuring time when receiving vehicle information including information indicating the direction indicator or the steering wheel 5 operating.

The control unit 21 includes the first obtaining unit 2101, the distracted driving determiner 2102, a second obtaining unit 2103, a third obtaining unit 2104, the condition changer 2105, the change pattern determiner 2106, and the alert instruction unit 2107.

The first obtaining unit 2101 will now be described.

As described below, the first obtaining unit 2101 reads driver information (first driver information and second driver information) from the storage unit 22 and obtains, as first detection information, a change pattern including chronological changes in the face orientation and chronological changes in the gaze direction of the driver as shown in FIG. 6. When the storage unit 22 stores image data including consecutive images of the head of the driver, the first obtaining unit 2101 may generate the change pattern. The first obtaining unit 2101 outputs the first detection information to the distracted driving determiner 2102 and the change pattern determiner 2106.

The change pattern determiner 2106 will now be described.

The change pattern determiner 2106 determines whether the change pattern based on the first detection information matches a reference pattern (described later), which is predetermined in accordance with a lane check by the driver.

Referring now to FIGS. 6 and 1, the reference patterns used as determination criteria and the measured change pattern will now be described. The reference patterns shown in FIG. 6 are preset in the change pattern determiner 2106. The reference patterns may be stored in the storage unit 22 as one type of the usual determination condition information used as the determination criteria. The reference patterns may be set in the change pattern determiner 2106 when the distracted driving determination apparatus 2 is activated.

The changes in the face orientation or in the gaze direction associated with looking back by the driver 100 will now be described. As shown in FIG. 6, for example, the driver 100 may have one of at least three reference patterns A, B, and C when looking back for a lane change.

In the reference pattern A, the driver 100 looks back in one stroke to change from the gaze P1 forward in the traveling direction to the gaze P3 along the area end rearward from the vehicle. The driver 100 checks the lane viewable with the gaze P3, and redirects his or her face forward to look in the front with the gaze P4 immediately after the check. The gazes P1 and P4 may both simply be within the check area F, and may not be in the same direction.

In the reference pattern B, the driver 100 stops his or her gaze at the side mirror 102 or 103 to check rearward with the gaze P2 while looking back from the front with the gaze P1 to the rear of the vehicle. When a vehicle traveling in the adjacent lane appears in the side mirror 102 or 103, the driver 100 immediately redirects his or her face forward to look in the front with the gaze P4.

In the reference pattern C, the driver 100 stops his or her gaze at the side mirror 102 or 103 to check rearward with the gaze P2 while looking back from the front with the gaze P1 to the rear of the vehicle. When no vehicle traveling in the adjacent lane appears in the side mirror 102 or 103, the driver 100 further looks back to the area end rearward from the vehicle with the gaze P3 to check the areas, and immediately redirects his or her face forward to look in the front with the gaze P4. The reference pattern C is a relatively common action as a lane check and takes a longer time than in a change pattern for the action of the driver looking back in one stroke and redirecting his or her face frontward. The reference pattern C thus takes attention.

A pattern measured in a lane check falls within one of the reference patterns A, B, and C described above. When the driver 100 checks rearward using a rear-view mirror, the driver 100 retains his or her gaze within the check area F, for which determination for a lane check is not performed.

The second obtaining unit 2103 will now be described.

The second obtaining unit 2103 obtains vehicle information including information indicating the operation of the direction indicator 7 detected by the direction indicator sensor 8A and information about the steering angle detected by the steering sensor 8B (hereafter, second detection information). The second obtaining unit 2103 outputs the second detection information to the condition changer 2105.

The third obtaining unit 2104 will now be described.

The third obtaining unit 2104 obtains detection information indicating the traveling state of the vehicle 1 (hereafter, third detection information) as described below.

The third obtaining unit 2104 first obtains detection information indicating a speed from the speed sensor 8I. The third obtaining unit 2104 then determines whether the vehicle 1 is traveling or stopped based on the detection information indicating the speed to obtain third detection information. The third detection information indicates whether the vehicle 1 is traveling or stopped. The third obtaining unit 2104 outputs the third detection information to the condition changer 2105.

The condition changer 2105 will now be described.

As described below, the condition changer 2105 changes the determination condition. The condition changer 2105 first receives the usual determination condition from the storage unit 22. The condition changer 2105 then obtains, from the change pattern determiner 2106, a determination result indicating whether the change pattern based on the first detection information obtained by the first obtaining unit 2101 matches any one of the reference patterns, or whether a lane check is detected. When the change pattern based on the first detection information is a lane check, the condition changer 2105 at least partially changes the usual determination condition to a temporary determination condition for detecting distracted driving. The determination using the temporary determination condition includes at least partially changing the usual determination condition to a temporary determination condition not to detect distracted driving when a detected action determined to be distracted driving under the usual determination condition has a change pattern matching one of the predetermined reference patterns. In other words, when the driver 100 redirects his or her face orientation or gaze direction toward the check area F within a determination criterion duration t4 (described later), the driver's action is determined to have a change pattern indicating a lane check for safety, for which distracted driving is not detected and the driver is not alerted. When the action has a change pattern other than for a lane check, the pattern does not match any of the reference patterns. In this case, the usual determination condition is unchanged, and the driver is alerted.

Another example for setting a temporary determination condition will be described. The change in the face orientation or gaze direction of the driver 100 is first determined to be a lane check. After the determination, the face orientation or gaze direction of the driver 100 may not be redirected to the check area F within the determination criterion duration t4 (described later). However, when receiving the second detection information, the condition changer 2105 sets a temporary determination condition changed from the usual determination condition for detecting distracted driving in the distracted driving determiner 2102. As described above, the second detection information is vehicle information including information indicating the operation of the direction indicator 7 or information about the steering angle detected by the steering sensor 8B. More specifically, the driver 100 changing lanes may look back for a lane check, and operate the direction indicator 7 and start operating the steering wheel immediately after the check. In this case, the distracted driving determiner 2102 determines that the lane check continues.

The determination by the distracted driving determiner 2102 using the usual determination condition will now be described.

As described below, when the distracted driving determination apparatus 2 is activated, the distracted driving determiner 2102 obtains the usual determination condition information from the storage unit 22 and sets the usual determination condition. When a change pattern is a lane check, the distracted driving determiner 2102 determines distracted driving using a temporary determination condition changed from the usual determination condition set by the condition changer 2105. When a measured change pattern indicated by the first detection information does not indicate a lane check, the determination condition is unchanged. Thus, the distracted driving determiner 2102 determines distracted driving using the initial usual determination condition.

In the above determination, the distracted driving determiner 2102 does not detect distracted driving when the driver 100 retains his or her gaze within the check area F. The distracted driving determiner 2102 detects distracted driving when the driver 100 retains his or her gaze or face orientation within the check area RM or LM for at least a mirror check duration. The mirror check duration is appropriately set as a duration for which the driver 100 takes to check the side mirror 102 or 103 or to directly check the side of the vehicle. The duration is, for example, one or two seconds.

The distracted driving determiner 2102 does not detect distracted driving when the driver 100 redirects his or her gaze or face orientation toward the check area F within a duration shorter than the mirror check duration. Similarly, the distracted driving determiner 2102 detects distracted driving when the driver 100 retains his or her gaze or face orientation within the check area RB or LB for at least a lane check duration for which the driver 100 takes to check any vehicle traveling behind in the adjacent lane. As described later, a lane check uses a lane check duration for which the driver 100 looking in the check area F takes to look back by turning his or her head around, and changing the gaze back and forth. When the distracted driving determiner 2102 detects distracted driving, the alert instruction unit 2107 outputs an instruction signal to the alert unit 13 to generate an alert. The alert unit 13 then generates an alert.

The determination criterion duration used in the distracted driving determination apparatus 2 will be described.

When moving to an adjacent lane R or L, the driver typically operates the steering wheel immediately after the check for any vehicle traveling behind in the adjacent lane or traveling behind in the same lane. The driver in a lane check may thus look back by turning his or her head around and then redirecting his or her head to the front in a short time. The time may be a few seconds although it changes depending on the weather or the road conditions. The distracted driving determination apparatus 2 in the present embodiment uses the determination criterion duration t4 set to, for example, four seconds. When the driver completes looking back and redirects his or her gaze forward within four seconds, the distracted driving determination apparatus 2 determines that the action including such looking back to be a lane check. When the driver does not stop looking back in four seconds without operating the direction indicator 7 or the steering wheel, the distracted driving determination apparatus 2 determines that the driver is engaging in an action other than a lane check, such as distracted driving. The determination criterion duration may not be four seconds. The duration may be changed as appropriate depending on the individual drivers or the condition of the traveling road, or when the vehicle speed is lower than a predetermined speed. A lane check excludes checking rearward when a pulled-over vehicle starts moving, or checking for any obstacle before turning right or left at an intersection, although such checking similarly includes rearward checking. Such checking may be determined using another criterion.

Lane Check

Figure 7:
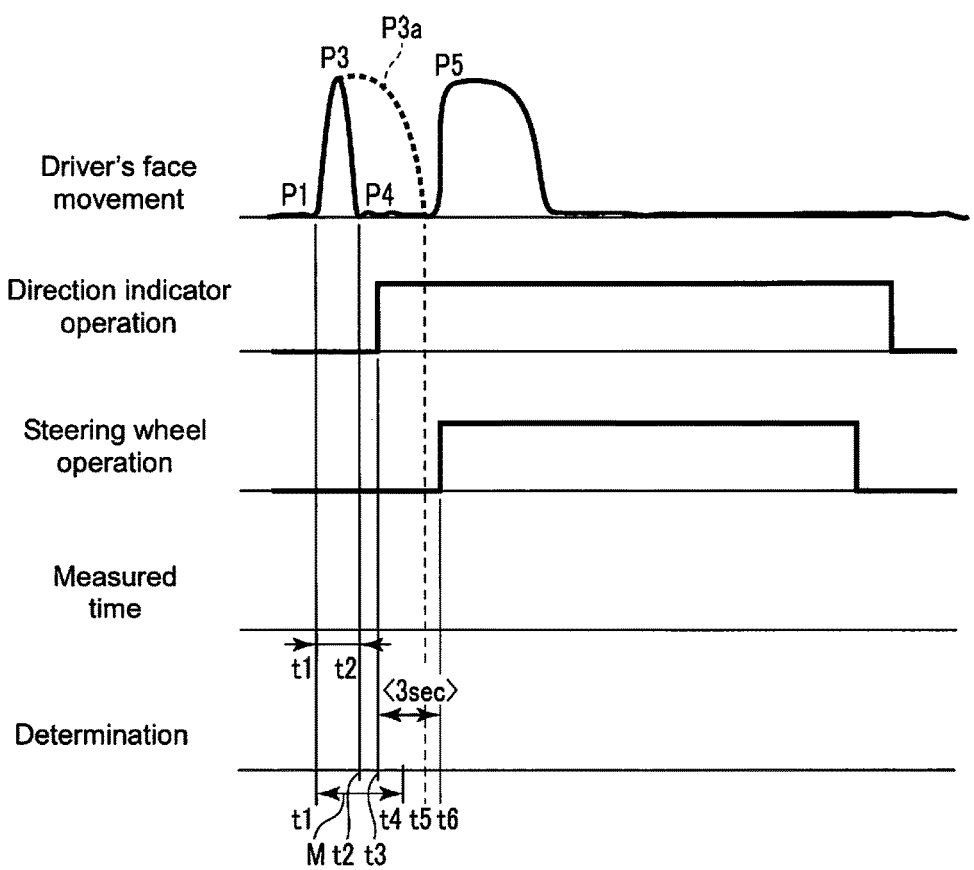
FIG. 7 is a timing chart describing a lane check performed in changing lanes.

Referring now to FIGS. 7 and 8, a lane check for the traveling vehicle changing lanes will now be described in detail. FIG. 7 is a timing chart describing a lane check in changing lanes. FIG. 8 is a flowchart describing a lane check. Examples of the lane check in the present embodiment include a lane check for the vehicle changing lanes with the direction indicator operated while the vehicle is traveling on a local road or an expressway with two or more lanes.

In the example shown in FIG. 7, the measurement start time t1 indicates the time at which time measurement is started for a lane check, the measurement time t2 indicates the time at which the time measurement is complete, the operation time t3 indicates the time at which the direction indicator 7 is operated (turned on), the determination criterion duration t4 indicates a set determination criterion, the measurement time t5 indicates the time at which the driver redirects his or her face after a lane check with a delay, and the operation time t6 indicates the time at which the driver starts operating the steering wheel 5. In the present embodiment, the distracted driving determination apparatus 2 uses a determination criterion duration t4 for a lane check set to four seconds as described above. The distracted driving determination apparatus 2 thus detects, in principle, distracted driving when four seconds pass after the gaze of the driver starts deviating from the check area F, which is the usual driving view area. The steering wheel is to be operated three or more seconds later after the direction indicator 7 is operated.

In step S1, a usual determination condition read from the storage unit 22 is set in the distracted driving determiner 2102 when, for example, the distracted driving determination apparatus 2 is activated.

The driver 100 looks back by directing his or her face from the front to the rear of the vehicle when changing lanes while the vehicle is traveling. The driver looking back in this manner can prevent the driver camera 14 from capturing images of the face of the driver. The driver information detector 31 then generates an instruction to the time measurement unit 24 to start measuring time at the measurement start time t1 (t1=0). When the driver 100 redirects his or her face orientation or gaze toward the check area F afterward, the above driver information (first driver information and second driver information) transmitted from the driver information detector 31 is stored into the storage unit 22. The first obtaining unit 2101 reads the driver information from the storage unit 22 to obtain the first detection information.

In step S2, the control unit 21 determines whether the first obtaining unit 2101 has obtained the first detection information. When determining that the first obtaining unit 2101 has obtained no first detection information (No in step S2), the control unit 21 continues detecting the face orientation or gaze. When obtaining the first detection information (Yes in step S2), the first obtaining unit 2101 transmits the first detection information to the change pattern determiner 2106.

In step S3, the change pattern determiner 2106 detects a change pattern of the gaze or face orientation of the driver based on the first detection information including the driver information.

In step S4, the change pattern determiner 2106 determines whether the change pattern matches one of the reference patterns predetermined in accordance with a lane check by the driver.

When the measured change pattern based on the first detection information matches one of the reference patterns (Yes in step S4), the condition changer 2105 changes the usual determination condition to a temporary determination condition in step S5.

In step S6, the distracted driving determiner 2102 determines whether the driver is engaging in distracted driving based on the change pattern based on the first detection information using the temporary determination condition changed by the condition changer 2105. When the change pattern determiner 2106 determines that the change pattern based on the first detection information does not match any of the reference patterns (No in step S4), the distracted driving determiner 2102 determines distracted driving using the usual determination condition initially set in step S6.

When distracted driving is detected (Yes in step S6), an alert is generated for the driver in step S7. When distracted driving is not detected (No in step S6), no alert is generated for the driver in step S8 based on the first detection information determined as a lane check, and the processing ends.

In the present embodiment, lane check determination is not performed while the direction indicator 7 is being operated and the steering angle is being detected. As shown in FIG. 7, the driver may perform the second action of looking back P5, or the driver may look back for the second time after looking back once before operating the steering wheel to change lanes. This second looking back P5 is not determined to be distracted driving.

In the present embodiment, the determination for distracted driving is disabled while the direction indicator is being operated. In the present embodiment, the driver follows the procedure for a lane check in which the driver first checks for any vehicle traveling behind in the adjacent lane. When finding no vehicle traveling in the adjacent lane, the driver operates the direction indicator and then the steering wheel to change lanes. However, some drivers may follow a different procedure, and may operate the direction indicator 7 first and then check for any vehicle traveling behind in the adjacent lane. In this case, the direction indicator 7 is operated first, which is then followed by a lane check including looking back. The condition changer 2105 thus changes the determination condition to disable distracted driving determination as described above.

At tollgates on a tollway such as an expressway, the driver finds fewer lanes and slows down the vehicle, and may cut in a lane by simply checking with another vehicle's driver without operating the direction indicator. When cutting in the lane, the driver is driving the vehicle ahead while checking the side and the rear. Thus, no images of the driver's face are captured for a long duration, and the gaze P1 of the driver deviates from the check area F. In this case, the vehicle may travel at a speed lower than a predetermined speed, and the steering wheel may be operated and the steering angle may be detected while the gaze P1 deviates from the check area F. This action of the driver may be determined to be a lane check, for which the distracted driving determination may be disabled.

The distracted driving determination apparatus may have various other distracted driving prevention modes or may be used as one of various other distracted driving detectors. The lane check mode may be one of other distracted driving prevention modes. In this case, such an apparatus may be provided by using components for the distracted driving determination apparatus installed in the vehicle.

For a distracted driving prevention mode or a distracted driving detector with a learning unit that learns the features of individual drivers to eliminate individual differences, the learning conditions may be tightened or learning may be disabled to prevent a lane check from being determined to be distracted driving before and after the lane check determination performed by the distracted driving determination apparatus according to the present embodiment.

The distracted driving determination apparatus according to the embodiment described above detects a check action including face movement and gaze movement of the driver who is looking back. When the time taken for the check action is within a predetermined determination criterion duration, the action is determined to be a lane check and is not determined to be distracted driving. This prevents such a quick lane check from being erroneously determined to be distracted driving and causing an unintended alert.

Further, the distracted driving determination apparatus determines that the lane check continues with the driving operation for changing lanes while the direction changer 7 or the steering wheel is being operated, although the gaze of the driver is not redirected to the predefined view area and the check operation takes more than the predetermined determination criterion duration. The apparatus thus prevents such a lane check from being erroneously determined to be distracted driving.

The present invention is not limited to the above embodiments, but may be modified variously without departing from the spirit and scope of the invention. The components disclosed herein may further be selected or combined to provide various aspects of the invention.

APPENDIXES

The present embodiment may be partially or entirely expressed in, but not limited to, the following forms shown in the appendixes below.

Appendix 1

A distracted driving determination apparatus, comprising:
a first obtaining unit (2101) configured to obtain first detection information indicating a change pattern of a gaze or a face orientation of a driver;
a change pattern determiner (2106) configured to read the change pattern obtained by the first obtaining unit (2101) and determine whether the change pattern matches a reference pattern predetermined in accordance with a lane check by the driver;
a condition changer (2105) configured to change a usual determination condition for detecting distracted driving and set a temporary determination condition when the change pattern is determined to match the reference pattern; and
a distracted driving determiner (2102) configured to determine distracted driving based on the first detection information using the usual determination condition or the temporary determination condition set by the condition changer (2105).

Appendix 2

A distracted driving determination method, comprising:
obtaining first detection information indicating a gaze or a face orientation of a driver (S2);
detecting a change pattern of the gaze or the face orientation of the driver based on the first detection information (S3), and determining whether the change pattern matches a reference pattern predetermined in accordance with a lane check by the driver (S4);
changing a determination condition for detecting distracted driving and setting a temporary determination condition when the change pattern is determined to match the reference pattern (S5); and
determining whether the driver is engaging in distracted driving based on the gaze or the face orientation of the driver indicated by the first detection information using the determination condition for detecting distracted driving or the set temporary determination condition (S6).

Appendix 3

A distracted driving determination apparatus (2) comprising a hardware processor (21) and a storage unit (22), the hardware processor (21) being configured to obtain first detection information indicating a gaze or a face orientation of a driver (S2);

detect a change pattern of the gaze or the face orientation of the driver based on the first detection information (S3), and determine whether the change pattern matches a reference pattern predetermined in accordance with a lane check by the driver (S4);

change a determination condition for detecting distracted driving and set a temporary determination condition when the change pattern is determined to match the reference pattern (S5); and determine whether the driver is engaging in distracted driving based on the gaze or the face orientation of the driver indicated by the first detection information using the determination condition for detecting distracted driving or the set temporary determination condition (S6).

Appendix 4

A distracted driving determination method implemented by an in-vehicle apparatus including a hardware processor (21) and a storage unit (22), the method comprising:

obtaining, with the hardware processor (21), first detection information indicating a gaze or a face orientation of a driver (S2);

detecting, with the hardware processor (21), a change pattern of the gaze or the face orientation of the driver based on the first detection information (S3), and determining, with the hardware processor (21), whether the change pattern matches a reference pattern predetermined in accordance with a lane check by the driver (S4);

changing, with the hardware processor (21), a determination condition for detecting distracted driving and setting a temporary determination condition when the change pattern is determined to match the reference pattern (S5); and determining, with the hardware processor (21), whether the driver is engaging in distracted driving based on the gaze or the face orientation of the driver indicated by the first detection information using the determination condition for detecting distracted driving or the set temporary determination condition (S6).

The invention claimed is:

1. A distracted driving determination apparatus, comprising a processor configured with a program to perform operations comprising operations as:

a first obtaining unit configured to obtain first detection information indicating a change pattern of a gaze or a face orientation of a driver;

a change pattern determiner configured to read the change pattern obtained by the first obtaining unit and determine whether the change pattern matches a reference pattern predetermined in accordance with a lane check by the driver;

a condition changer configured to change a usual determination condition for detecting distracted driving and set a temporary determination condition when the change pattern is determined to match the reference pattern;

a distracted driving determiner configured to determine distracted driving based on the first detection information using the usual determination condition or the temporary determination condition set by the condition changer; and an alert instruction unit configured to output an instruction signal to generate an alert when the distracted driving determiner detects distracted driving.

2. The distracted driving determination apparatus according to claim 1, wherein the change pattern determiner defines an imaginary lane check area at least rightward or leftward from a vehicle, and the change pattern determiner determines that the change pattern of the gaze or the face orientation of the driver matches the reference pattern associated with a lane check by the driver when the gaze or the face orientation of the driver indicated by the first detection information changes by at least an angle of the lane check area and also the gaze or the face orientation is redirected to an original position within a predetermined first duration after starting to change from the original position.

3. The distracted driving determination apparatus according to claim 2, further comprising:

a second obtaining unit configured to obtain second detection information indicating an operation of a direction indicator, wherein the condition changer changes the determination condition for detecting distracted driving and set the temporary determination condition during the operation of the direction indicator indicated by the second detection information irrespective of a determination result from the change pattern determiner.

4. The distracted driving determination apparatus according to claim 2, further comprising:

a second obtaining unit configured to obtain second detection information indicating an operation of a steering unit for changing a traveling direction of the vehicle, wherein the condition changer changes the determination condition for detecting distracted driving and set the temporary determination condition during the operation of the steering unit for changing the traveling direction of the vehicle indicated by the second detection information irrespective of a determination result from the change pattern determiner.

5. The distracted driving determination apparatus according to claim 1, wherein the change pattern determiner defines an imaginary first lane check area at a position of a side mirror at least rightward or leftward from a vehicle, and an imaginary second lane check area rearward from the first lane check area for the driver to directly check a lane, and the change pattern determiner determines that the change pattern of the gaze or the face orientation of the driver matches the reference pattern associated with a lane check by the driver when the gaze or the face orientation indicated by the first detection information starts changing and is retained in the first lane check area, changes by at least an angle of the second lane check area, and also the gaze or the face orientation is redirected to an original position within a predetermined second duration after starting to change from the original position.

6. The distracted driving determination apparatus according to claim 5, further comprising:

a second obtaining unit configured to obtain second detection information indicating an operation of a direction indicator, wherein the condition changer changes the determination condition for detecting distracted driving and set the temporary determination condition during the operation of the direction indicator indicated by the second detection information irrespective of a determination result from the change pattern determiner.

7. The distracted driving determination apparatus according to claim 5, further comprising:

a second obtaining unit configured to obtain second detection information indicating an operation of a steering unit for changing a traveling direction of the vehicle, wherein the condition changer changes the determination condition for detecting distracted driving and set the temporary determination condition during the operation of the steering unit for changing the traveling direction of the vehicle indicated by the second detection information irrespective of a determination result from the change pattern determiner.

8. The distracted driving determination apparatus according to claim 1, further comprising:

a second obtaining unit configured to obtain second detection information indicating an operation of a direction indicator, wherein the condition changer changes the determination condition for detecting distracted driving and set the temporary determination condition during the operation of the direction indicator indicated by the second detection information irrespective of a determination result from the change pattern determiner.

9. The distracted driving determination apparatus according to claim 1, further comprising:

a second obtaining unit configured to obtain second detection information indicating an operation of a steering unit for changing a traveling direction of a vehicle, wherein the condition changer changes the determination condition for detecting distracted driving and set the temporary determination condition during the operation of the steering unit for changing the traveling direction of the vehicle indicated by the second detection information irrespective of a determination result from the change pattern determiner.

10. A distracted driving determination method implemented by an in-vehicle apparatus, the method comprising:

obtaining first detection information indicating a gaze or a face orientation of a driver;

detecting a change pattern of the gaze or the face orientation of the driver based on the first detection information, and determining whether the change pattern matches a reference pattern predetermined in accordance with a lane check by the driver;

changing a determination condition for detecting distracted driving and setting a temporary determination condition when the change pattern is determined to match the reference pattern;

determining whether the driver is engaging in distracted driving based on the gaze or the face orientation of the driver indicated by the first detection information using the determination condition for detecting distracted driving or the set temporary determination condition; and outputting an instruction signal to generate an alert when the distracted driving determiner detects distracted driving.

11. A non-transitory recording medium having a program recorded thereon causing a hardware processor included in the distracted driving determination apparatus according to claim 1 to function as the units included in the distracted driving determination apparatus.

* * * * *